Feb. 4, 1969 A. O. ALBRIGHT 3,425,568
WALL MOUNTED EDUCATIONAL DEVICE
Filed Aug. 18, 1966
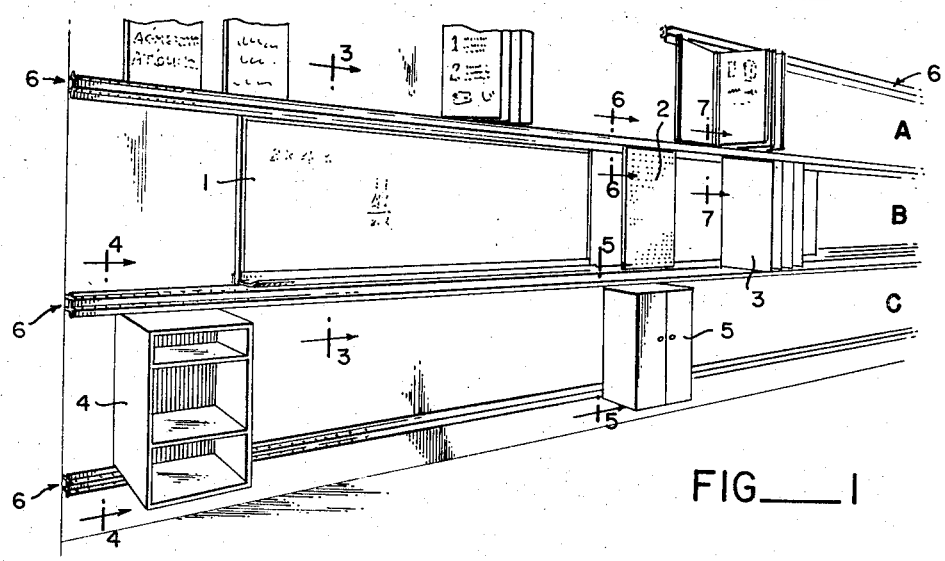
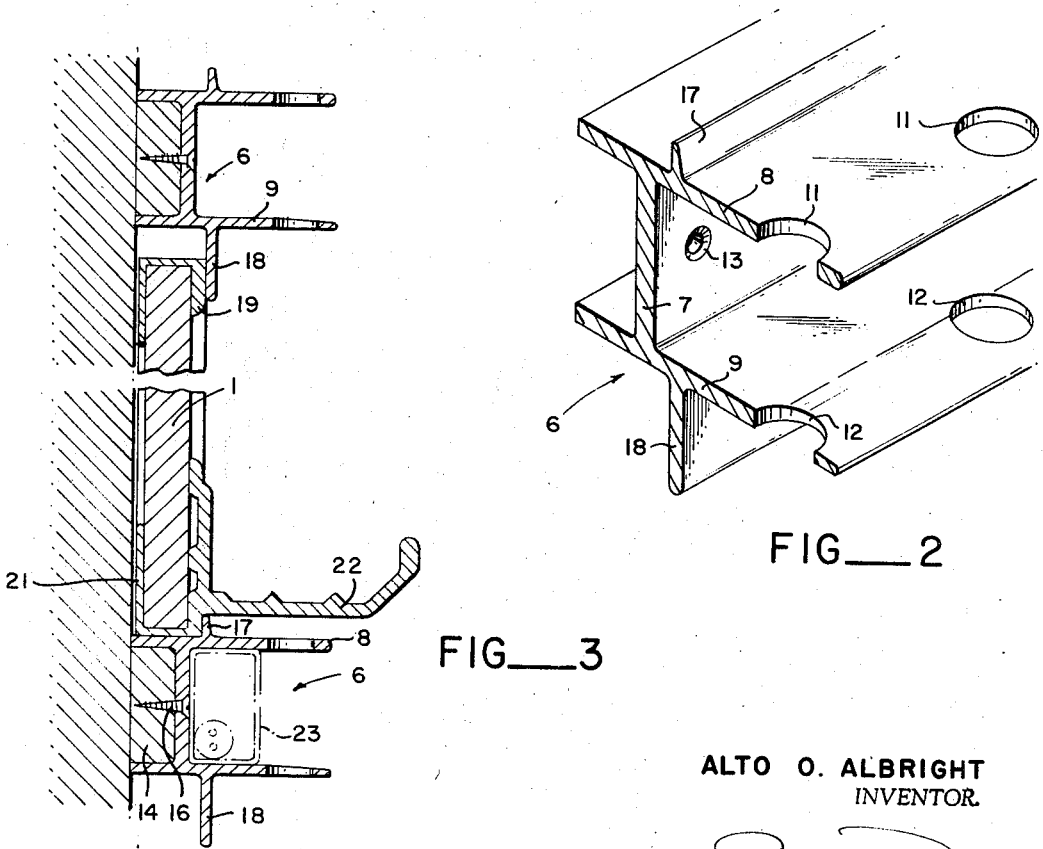
ALTO O. ALBRIGHT
INVENTOR.
BY
ATTORNEYS

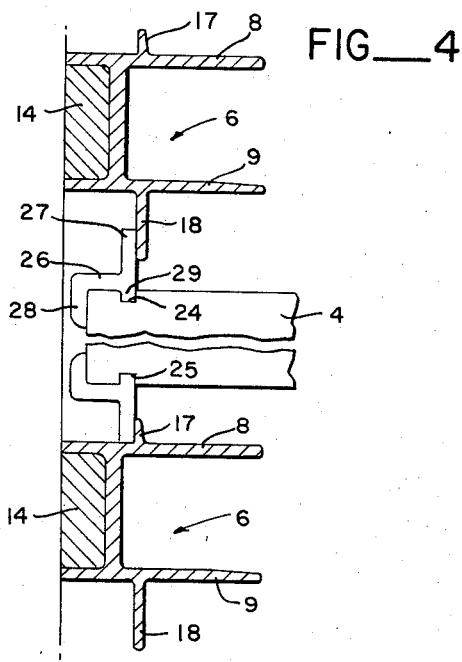
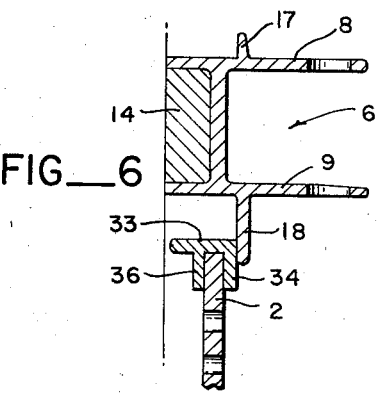
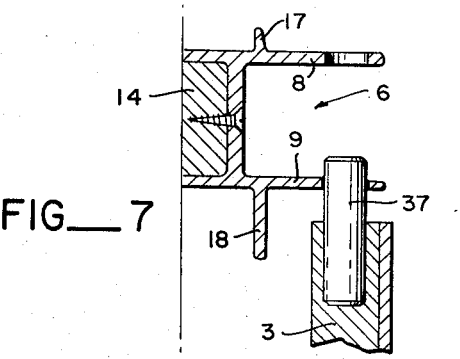
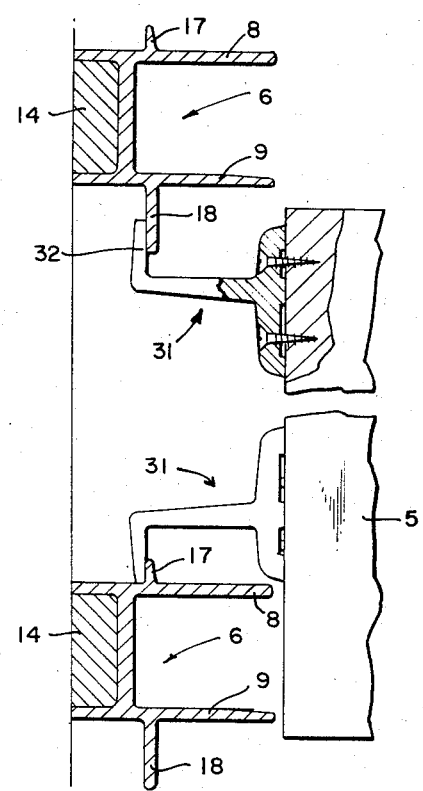

United States Patent Office 3,425,568
Patented Feb. 4, 1969

3,425,568
WALL MOUNTED EDUCATIONAL DEVICE
Alto O. Albright, 818 16th Ave. West,
Kirkland, Wash. 98033
Filed Aug. 18, 1966, Ser. No. 573,371
U.S. Cl. 211—87
Int. Cl. A47f 5/08; B43l 1/04; A47b 97/02
15 Claims

ABSTRACT OF THE DISCLOSURE

A structural arrangement and system for implementing visual presentation of information on the classroom or group basis. A wall surface or other vertical surface of a room is provided with a plurality of parallel vertically spaced mounting strips which cooperate with the wall surface to form upper and lower retention channels for demountably supporting such items as blackboards, apertured boards, storage cabinets, wardrobes or any other item normally used in classrooms or the like. The mounting strips also provide mounting means for swingably mounting vertically disposed display panels which are used in conjunction with the other items mounted on the walls for instructional purposes.

Background of the invention

The present invention relates to novel structural arrangements for mounting informational displays, teaching materials, tools for education, classroom storage units and the like. The present invention also provides a method of visual presentation of information on a classroom or group basis which enables an instructor to readily convey information and techniques with increased speed and efficiency to facilitate the learning process.

In the past, classrooms, laboratories, and shops, whether for public schools, adult education, industrial training courses, business training or military training, have been arranged and designed with little attention to efficient use of wall space and other available facilities about the classroom. Reliance has primarily been placed on lecture or demonstration by the lecturer or instructor followed by an attempt by the individual students to put the newly learned information to work on a project, experiment or test. In any group of students different levels of comprehension and retention are present with the result that many repetitions on an individual basis and constant attention by the instructor is necessary following a demonstration. In addition to this, subject matter involving the use of tools and work materials further complicates the process since the instructor must spend a large percentage of his time distributing and collecting materials and explaining the use of tools and instruments. In many instances, the mechanics of instruction become so burdensome that the instructor is ineffective and the students become disinterested. According to the present invention means and method for transferring knowledge from the instructor to the student are provided which eliminate the time lag between reception of the information and the participation by the student. According to the present invention, the students, both slow and fast learners, experience immediate involvement and are not hampered by the lack of personal attention since the basic concept to be learned is constantly present along with adequate equipment. The invention results in a closer approach to the one-to-one concept found most effective in any teacher pupil situation.

Accordingly, one object of the present invention is to provide a novel structural arrangement for use in equipping a classroom or other area with educational media, tools, displays and equipment and other materials which are constantly and readily available to students in addition to personal attention by the instructor.

Another object of the present invention is to provide a method for transferring knowledge in a more efficient and comprehensive manner so as to stimulate student involvement and self learning.

Other objects and advantages of the present invention will become apparent to those skilled in the art from the following specification and appended claims and from the accompanying drawings, wherein:

FIG. 1 illustrates a typical installation for use of the invention in a classroom;

FIG. 2 is a sectional view of a mounting strip according to the present invention;

FIG. 3 is a cross sectional view taken along the lines 3—3 of FIG. 1;

FIG. 4 is a cross sectional view taken along lines 4—4 of FIG. 1;

FIG. 5 is a cross sectional view taken along lines 5—5 of FIG. 1;

FIG. 6 is a cross sectional view taken along lines 6—6 of FIG. 1; and

FIG. 7 is a cross sectional view taken along lines 7—7 of FIG. 1.

Referring now to the details of the drawings, the preferred structural embodiment will be described.

FIG. 1 illustrates a typical classroom wall installation according to the present invention. It has been found in practice that a classroom wall may be provided with as many as three different levels of usage as at A, B, and C to obtain the maximum benefit of the present system. With this system, and referring to a classroom by way of example and not limitation, such items as a blackboard 1, apertured board 2, a swingable display panel 3, storage cabinets 4 and a wardrobe 5 may be removably mounted as desired. With standardized spacing and construction the units are completely interchangeable and may be mounted at any desirable spot on the wall surface at any one of the three levels. The units are mounted between novel mounting strips indicated generally at 6 with four such strips being utilized to obtain tri-level usage of the wall as illustrated in FIG. 1. The strips 6 may be spaced at a standard distance of 30 inches, for example, and may be placed in continuous end-to-end relation without limitation. The novel configuration of the strip 6 is illustrated in FIG. 2 with FIGS. 3 through 5 illustrating alternate forms of mounting brackets for different types of demountable units between the strips.

Referring to FIG. 2, the strip 6 may be formed by extrusions of such metals as aluminum, or other lightweight metals or plastics or, in the alternative, may be formed from wood stripping as desired. The strip may be formed with a body or web portion 7 which connects two vertically spaced horizontal flanges 8 and 9 respectively. The flanges 8 and 9 are provided with longitudinally spaced holes 11 and 12 respectively which are vertically aligned for a purpose to be described. The holes 11 and 12 are closely adjacent the outside edge of each of the flanges remote from the wall as illustrated in FIG. 1. The web or body 7 may be provided with suitable holes 13 for receiving screws or the like to fix the strip to the wall as illustrated in FIG. 3. The mounting strips 6 will normally be attached to the wall by means of wood spacers such as that shown at 14 in FIG. 3 with screw fasteners or the like 16 serving to hold the strips in position. The members 14 may be continuous wood strips if desired and provides a solid mounting for the strips.

The top flange 8 is provided with an upwardly extending projection 17 spaced outwardly from the wall which cooperates with the wall surface to form a first guide channel on the top of the strip when the strip is installed. The bottom flange 9 is also provided with a projection 18 spaced outwardly from the wall surface and which is of a greater length than the projection 17 for a purpose which will be presently understood. The projection 18 cooperates with the wall surface to form a second channel when the strip is installed.

FIG. 3 illustrates the mounting arrangement for a blackboard 1 between two vertically spaced parallel strips 6. The blackboard 1 if desired may be fitted with edging 19, U-shaped in cross section, which is so proportioned as to fit between the projection 18 on the bottom of the flange 9 of the upper strip and the wall. The bottom edge of the blackboard 1 is provided with an edging strip which may be extruded aluminum or the like 21 provided with an outwardly extending chalk tray 22. The edging 21 will be so proportioned as to fit between the upwardly extending projection 17 on the top flange 8 of the lower strip 6. It is, of course, possible to eliminate the edging member if the blackboard is constructed of material of sufficient strength and of the proper dimensions to fit between the respective projections and the wall surface. As illustrated, the height of the blackboard is less than the distance between the flanges of the strips thereby enabling the blackboard to be mounted by merely inserting the upper edge in the channel provided by the projection 18 and then seating the bottom edge in the channel provided by the projection 17. The blackboard is thus completely adjustable in position and may be slid along the strips or may be removed and placed about the room in any one of the three levels as illustrated.

FIG. 3 also illustrates a further use of the strip 6 for conveniently mounting an electrical receptacle indicated generally at 23 between the flanges 8 and 9 of the strip. The mounting of the continuous receptacle 23 may be made without interfering whatsoever with the functioning of the strips 6.

FIG. 4 illustrates a structural arrangement for mounting the storage cabinet 4 between two parallel strips. In this instance, the cabinet 4 is provided with grooves 24 and 25 on the top and bottom surfaces adjacent the rear edge of the cabinet and identical mounting brackets 26 are secured to the top and bottom rear edges of the cabinet. Each mounting bracket 26 includes a horizontal portion with upwardly and downwardly extending legs 27 and 28 respectively. A ridge or projection 29 serves to engage the groove 24 or 25 in the cabinet with the downwardly projecting leg 28 engaging the back side of the cabinet. The cabinet may then be mounted between the strips 6 in the channels provided as illustrated in FIG. 4.

FIG. 5 illustrates an alternative form of attaching means which may be utilized with such items as a cabinet or the like similar to that of FIG. 4. In this instance, identical elongated brackets 31 may be screw fastened to the back side of the unit with vertical flanges 32 serving to engage the projections 17 and 18 on the respective strips 6.

FIG. 6 illustrates an embodiment of mounting means for use with pegboard or the like 2. Although only the top edge of the pegboard 2 is illustrated in FIG. 6, it will be understood that the bottom edge may be provided with the same type of edging. The edging members 33 comprise a horizontal leg which serves to space the pegboard at a fixed position in the groove of the mounting strip 6 with the downwardly extending projections 34 and 36 engaging opposite faces of the pegboard 2. The pegboard with the edging strips is then removably inserted in the channels provided by the mounting strips 6 as previously described and illustrated in FIG. 6.

FIG. 7 illustrates the means whereby swingable panels may be mounted between parallel strips 6 at any given position. The panel 3 will be provided with dowels or the equivalent 37 on one corner at both top and bottom which may be inserted in the vertically aligned holes 11 and 12 of the respective strips 6. The panels 3 are freely swingable and may be used for presenting illustrations, displays, test questions or any other graphics presentation.

According to the present method, a lecture or instruction may be given by the instructor from a panel such as the panel 3 or a series of panels presenting graphically the information to be learned. Such panels may also contain step-by-step illustration of techniques such as may be necessary in arts and crafts, the field of music or any other field without limitation. The panels then remain in full view for the student's use after the instructor is finished. In addition, the instructor need not spend his time checking tools, reference books or other reference materials in and out since they may be made available in such units as the cabinets 4 and 5, peg boards 2 or on panels 3 and are at all times in full view of the instructor and student. The student has at all times available to him the basics presented by the instructor through use of the panels 3 or the movable blackboard 1 and in some instances, may be allowed to remove the panels to his desk for further study and observation. In this manner the student becomes immediately involved once the instructor's presentation has been completed and may go directly to the task of applying the information to the project assigned. The instructor is then free to give whatever special help the student requires without having to constantly repeat the basic material presented. The present method of information display is also adaptable to training courses and informational display throughout industry and business as well as the military. The present method combines into a workable system the functions of storing, illustrating and making available a great variety of ideas and materials to relieve the mechanics of teaching and information transmittal.

From the foregoing it will be appreciated by those skilled in the art that the present invention provides significant improvements in instruction methods and display and apparatus therefor. Changes in the details of construction will suggest themselves and may be resorted to without departing from the spirit of the invention.

Having thus described the invention what is new and desired to be covered by Letters Patent is:

1. A mounting strip of the character described comprising; means forming a body portion adapted for attachment to a wall surface, said body portion including upper and lower surfaces extending outwardly from the wall surface, means associated with each said upper and lower surface cooperating with the wall surface to form respective retention channels therealong, and a plurality of longitudinally spaced holes in each said upper and lower surface adjacent the edge thereof remote from the wall surface.

2. The mounting strip according to claim 1 wherein said channels are of substantially equal width, and said upper and lower surfaces extend substantially normal to the wall surface, said holes being in vertical alignment.

3. The mounting strip according to claim 1 wherein the means forming said channels comprise; a first projection extending vertically upwardly from said upper surface and a second projection extending vertically downward from said lower surface.

4. The mounting strip according to claim 2 wherein the means forming said channels comprise; a first projection extending vertically upwardly from said upper surface and a second projection extending vertically downwardly from said lower surface.

5. The mounting strip according to claim 4 wherein; the length of said second projection is substantially greater than the length of said first projection.

6. The mounting strip according to claim 1 wherein; upper and lower surfaces are formed by upper and lower flanges connected to said body portion.

7. The mounting strip according to claim 6 wherein the means forming said channels comprise; a first projection extending vertically upwardly from said upper surface, and a second projection extending vertically downwardly from said lower surface.

8. The mounting strip according to claim 7 wherein; said upper and lower flanges extend substantially normal to the wall surface, and said holes are vertically aligned.

9. In combination; a plurality of mounting strips for holding demountable units between adjacent strips, said strips being fixed to a wall surface and extending in parallel relation; each said strips including means forming a body portion for attachment to a wall surface, said body portion including upper and lower surfaces extending outwardly from the wall surface, means associated with each said upper and lower surface cooperating with the wall surface to form a respective retention channel therealong, and a plurality of longitudinally spaced holes in each said upper and lower surface adjacent the edge thereof remote from the wall surface.

10. The combination according to claim 9 including; a service unit mounted between said mounting strips, said unit having a substantially vertical side surface portion for positioning adjacent said wall surface, the vertical dimension of said side surface portion being less than the vertical distance between said strips, and top and bottom substantially horizontal surface portions joining said side surface, first and second grooves extending along the edges of said top and bottom surfaces respectively adjacent said side surface, and a bracket element associated with each said groove, each bracket unit comprising a horizontal body portion with a projection thereon engaging the associated groove, a first leg extending at right angles in a first direction from the body portion and engaging said side surface, and a second leg extending in the opposite direction from the body portion; the second legs of said bracket elements being engaged in said channels to hold the unit therebetween in slidable relation to the strips.

11. The combination according to claim 9 including; a service unit mounted between said mounting strips, said unit having a substantially vertical surface for positioning adjacent said wall, first and second bracket elements fixed to said vertical surface in vertically spaced relation; each of said bracket elements including an L-shaped arm having a substantially horizontal portion extending toward the wall and a substantially vertically extending portion engaging the channel a respective one of said strips to hold the unit therebetween in slidable relation therewith.

12. The combination according to claim 9 including; a vertically disposed panel mounted disposed panel mounted between said mounting strips, said panel having top and bottom edge portions located within said channels, top and bottom edging strips secured to the top and bottom edges respectively, each said edging strip comprising a U-shaped body portion engaging the associated panel edge and a rearwardly directed projection; said projection serving to hold said panel in spaced slidable relation with the wall surface.

13. The combination according to claim 9 including; a vertically disposed panel mounted between said mounting strips, said panel having aligned projections extending from opposite ends of one side forming a pivotal axis, said projections extending through vertically aligned holes in adjacent, parallel strips, whereby said panel is retained in swingable relation between the strips.

14. In combination, a system for demountably attaching visual aids, storage units and normally floor-supported units to a vertical surface comprising; a plurality of parallel vertically spaced horizontal mounting strips adapted to be secured to a vertical surface, each of said strips having means on the upper and lower sides thereof adapted to cooperate with said vertical surface to form retention channels therealong with the retention channels on adjacent strips providing mounting means for slidably and readily demountably supporting normally floor-supported units, and vertically aligned longitudinally spaced openings in the upper and lower sides of said strips for simultaneously swingably mounting vertically disposed display panels having axis means extending from opposite ends of one side and through said openings in the upper and lower side of adjacent mounting strips.

15. In combination, a system for demountably attaching visual aids, storage units and normally floor-supported units to a vertical surface comprising; a plurality of horizontal mounting strips adapted to be secured to a vertical surface in parallel uniformly spaced relation, each of said strips including a body portion adapted for attachment to said vertical surface, said body portion including horizontal projections providing upper and lower independent surfaces extending outwardly from and substantially normal to the vertical surface, said upper and lower surfaces having longitudinally spaced vertically aligned holes therethrough, a first vertical projection extending upwardly from said upper surface and a second vertical projection extending downwardly from said lower surface, each of said first and second vertical projections of each mounting strip adapted to cooperate with the vertical surface to form a retention channel therealong, said plurality of mounting strips thereby forming means to slidably and readily demountably support normally floor-supported units between said strips and within said channels and simultaneously swingably mount vertically disposed display panels having axis means extending from opposite ends of one side and through said holes in the upper and lower surfaces of adjacent mounting strips.

References Cited

UNITED STATES PATENTS

| 1,251,254 | 12/1917 | Lough | 211—169 |
| 2,617,219 | 11/1952 | Conley et al. | 211—169 XR |
| 2,679,700 | 6/1954 | Urbain | 52—36 XR |
| 2,947,093 | 8/1960 | Masters | 52—36 XR |
| 3,133,642 | 5/1964 | Mohr et al. | 211—86 |
| 3,175,306 | 3/1965 | Veronica | 35—40 |

CHANCELLOR E. HARRIS, *Primary Examiner.*

U.S. Cl. X.R.

211—94, 96, 169